United States Patent [19]

Hamilton et al.

[11] Patent Number: 5,446,112
[45] Date of Patent: Aug. 29, 1995

[54] MELT PROCESS FOR THE SYNTHESIS OF TIN(II) TEREPHTHALATE

[75] Inventors: Douglas G. Hamilton, Mt. Vernon, Ind.; Christopher M. Hawkins, Alexandria, Ohio

[73] Assignee: General Electric Company, Pittsfield, Mass.

[21] Appl. No.: 125,099

[22] Filed: Sep. 22, 1993

[51] Int. Cl.$^6$ .............................................. C08G 79/00
[52] U.S. Cl. ....................... 528/9; 528/271; 528/272; 528/283; 528/275
[58] Field of Search .................. 528/9, 271, 272, 283, 528/275

[56] References Cited

U.S. PATENT DOCUMENTS 3,240,552  3/1966  Joyner et al. .................... 292/111
4,970,288  11/1990  Larkin et al. .................... 528/272

FOREIGN PATENT DOCUMENTS 49-001434  1/1974  Japan .
491611  2/1976  U.S.S.R. .

OTHER PUBLICATIONS

Hyde et al., "Magnetic Exchange . . . " Inorganica Chimica Acta. 19(1976) 51–59.
Aritomi et al., "Solvent Effects On The PMR Spectra . . . " Journal of Organometallic Chemistry, 90 (1975) 185–194.
Reaction of alpha-oxides with alkyltin acylates, Inst. Plast. Mass., Klebanov, M. S.; Kravchuk, T. N.; Smirnov, Yu, I., 59(I), 157–656 (Russ) 1989 (abstract).
Use of terephthalates in rubber compounding, Grossman, Richard F.; McKane, Frank W., Jr. (Synthetic Prod. Co., Stratford, Conn., USA). Gummi, Fasern. Kunstst., 41(7), 356–8 (Ger) 1988 (abstract).
Synthesis of organotin carboxyl monomers and polymers and study of their effect on the biological activity of marine macrophyte spores. Naidenko, I. P., Mamedova, S. G.; Rzaev, Z. M.; Dzhafarov, V. D.; Dunyamaliev, A. D. (Inst. Khlororg. Sint., Sumgait, USSR) Viniti 2412-84 (Russ 1984) (abstract).
Synthesis of tin poly(cobalticinium esters). Carraher, Charles E., Jr. Peterson, Geroge F.; Sheats, John E. (Dep. Chem., Univ. S.D., Vermillion, S.D., USA), Am. Chem. Soc., Div. Org. Coat. Plast. Chem., Pap., 33(2) 427–32 (Eng) 1973 (abstract).

*Primary Examiner*—James J. Seidleck
*Assistant Examiner*—Terressa Mosley

[57] ABSTRACT

A melt process for the synthesis of poly(metal aromatic esters) resins is provided. The process provides volatile byproducts which can be easily separated from the desired poly(metal aromatic ester) resin product. The poly(metal aromatic ester) resins are particularly useful as polymer additives for the purpose of such things as scavenging traces of water, activating sulphur accelerator crosslinking systems, and producing intumescent and polyester/metal oxide formulations.

13 Claims, No Drawings

MELT PROCESS FOR THE SYNTHESIS OF TIN(II) TEREPHTHALATE

BACKGROUND OF THE INVENTION

1. Field of the Invention

This invention relates to a melt process for the synthesis of poly(metal aromatic ester) resin compositions, and more particularly relates to an improved process for making poly(metal aromatic ester) resins wherein the byproducts formed thereby are volatile.

2. Description of the Related Art

Poly(metal aromatic ester) resins such as calcium terephthalate polymers, zinc terephthalate polymers and tin terephthalate polymers are known, and are in use as additives for thermoplastic compositions because of properties such as their use as scavengers for traces of water, their use as polymeric lubricants, their use as activators for sulphur accelerator crosslinking systems, and their use for generating intumescent char in such compositions. Suitable resins compositions for incorporating the above additives include polypropylene compositions, polyester compositions, and elastomeric compositions such as styrene butadiene rubber and EPDM.

Method for making poly(metal aromatic ester) resins include such known processes as reaction of an aqueous solution of metal terephthalate, for example, sodium terephthalate, with an aqueous stanous halide solution, to form poly(stanous terephthalate) and sodium halide (metal halide salt). The polymer formed precipitates out of solution and is difficult to further purify due to its solvent resistance. Thus metal halide salt trapped in the polymer matrix cannot be removed thereby posing contamination problems. The product thus formed has metal halide salts contaminates in excess of 100 parts per million by weight.

Accordingly, there is a need to provide an improved method for making poly(metal aromatic ester) resins which leads only to volatile byproducts being developed, and being free of non-volatile byproducts in the poly(metal aromatic ester) resin.

SUMMARY OF THE INVENTION

The present invention provides an improved process for making a poly(metal aromatic ester) resin, and produces only volatile byproducts which are easily separated from the desired intermediate products and final products. The process involves reacting an aromatic monocarboxylic acid with a metal oxide to yield a metallic aromatic ester and water. The water can be easily distilled from the metallic aromatic ester. The metallic aromatic ester can then be reacted with a dialkyl ester of an aromatic dicarboxylic acid to yield a metallic-di-(monoalkyl aromatic carboxylate) which in turn can then be reacted with metallic aromatic ester to produce the desired poly(metal aromatic ester) resin.

DETAILED DESCRIPTION OF THE INVENTION

The process for making the poly(metal aromatic ester) resin involves (a) reacting
 (i) an aromatic monocarboxylic acid with
 (ii) a metal oxide, to produce a metallic aromatic ester and water, (b) separating the water from the metallic aromatic ester, (c) reacting the metallic aromatic ester with a dialkyl ester of aromatic dicarboxylic acid to produce a metallic-di-(monoalkyl ester of aromatic dicarboxylic acid) and an alkyl ester of an aromatic monocarboxylic acid;

(d) reacting the metallic-di-(monoalkyl ester of aromatic dicarboxylic acid) with metallic aromatic ester to produce the poly(metal aromatic esters).

The aromatic monocarboxylic acids are preferably of the formula

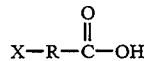

The divalent R radicals are aromatic radicals and are more preferably of the formula

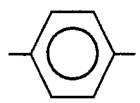

The divalent aromatic radicals may have ortho, meta and/or para substitution. X is preferably hydrogen but may be selected from the group consisting of halogens, amines, alkyls preferably having 1 to 4 carbon atoms and nitro groups. Suitable X groups $CH_3$—, $H_2N$—, Br, and ON for example.

The preferred aromatic monocarboxylic acid is benzoic acid which is represented by the formula

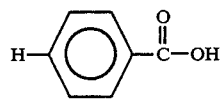

The metal oxides suitable for use in the present melt process may be represented by the general formula
MO wherein M is preferably a divalent metal, and is preferably selected from group II, group IV and group VIII metals, and is most preferably selected from metals such as Be, Mg, Ca, Sr, Ba, Ra, Sn, Pb, Ge, Hg, Cd, Zn, Cu, Ni, Pd, Pt, Co, Rh, Ir, Fe, Ru, Os, Ti, Zr, Hf, Cr, Mo, W, and Mn, and most preferably is tin(II). The preferred metal oxide is stanous oxide (SnO), also referred to as tin oxide.

The product from the first reaction step is a metallic aromatic ester, represented by the general formula

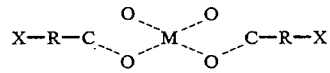

wherein R, M and X are as previously defined. The preferred metallic aromatic ester is tin(II) benzoate. During the first reaction step of the aromatic monocarboxylic acid and the metal oxide wherein the metallic aromatic ester is formed, a byproduct of water is also formed. The water may be easily separated from the metallic aromatic ester by such methods as distillation.

The dialkyl ester of an aromatic dicarboxylic acid may be represented by the general formula

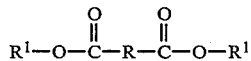

wherein R is as defined above, and $R^1$ is selected from monovalent alkyl radicals, preferably having from 1 to 4 carbon atoms, and most preferably being a methyl group. The preferred dialkyl ester of an aromatic dicarboxylic acid is dimethyl terephthalate which may be represented by the formula

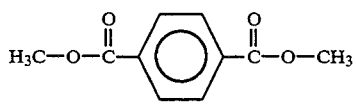

Preferably $R^1$ is selected from the alkyl groups of methyl, ethyl, propyl and butyl.

The alkyl ester of an aromatic monocarboxylic acid may be represented by the general formula

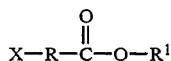

wherein R, $R^1$ and X are as defined above, and is preferably of the formula

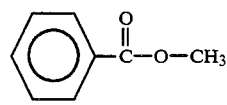

and more specifically is preferably methyl benzoate.

The metallic-di-(mono alkyl ester) of an aromatic dicarboxylic acid may be represented by the general formula

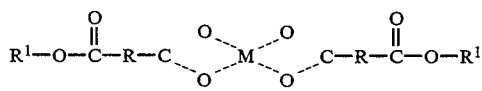

wherein $R^1$, R and M are as defined above, and preferably is a tin-di-(mono methyl terephthalate), of the formula

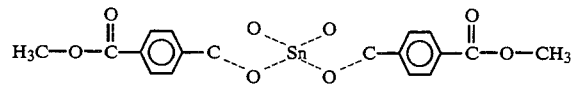

The final product which is a poly(metal aromatic ester) resin comprises units of the formula

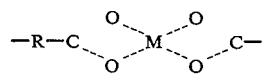

The (metal aromatic ester) resin preferably has the above units sequentially repeating, and preferably consists of or consists essentially of the above units. The entire poly(metal aromatic ester) resin, may be exemplified by the formula

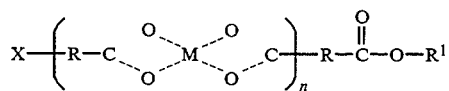

Although various different end groups may be employed depending on the desired end groups for the polymer. The value for n may range from anywhere between 10 and 10,000, preferably being between 100 and 2,000. The poly(metal aromatic ester) resins have a number of very specific product uses, including those set out above. The process has the advantage of yielding only volatile byproducts, which may be easily separated by application heat through such processes of distillation or by washing in hot alcohol such as ethanol. Thus, an improved purity product is also attained by the process of the present invention.

The process of the present invention is a melt process for making a poly(metal aromatic ester) resin, and (when X is hydrogen) comprises (A) reacting

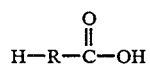 (i)

with

MO (ii)

to produce

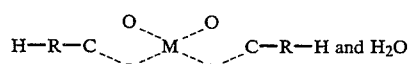 and $H_2O$ (B) reacting the

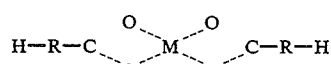 (i)

with

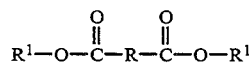 (ii)

to produce

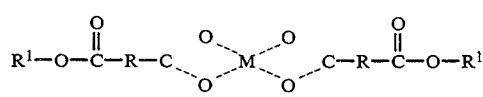

plus

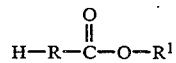

(C) reacting the

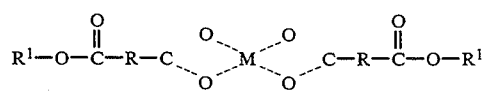

with

-continued

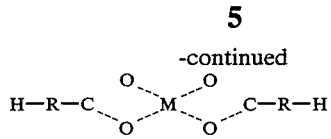

to produce the poly(metal aromatic esters), the poly(metal aromatic esters) comprising units of the formula the reaction the temperature is above 190° C., ensuring that the tin(II) benzoate is a melt. To this melt is added one equivalent of dimethyl terephthalate. The tin(II) benzoate, a transesterification catalyst, reacts with the added ester to first give methyl benzoate. Methyl benzoate is removed by distillation. The polymer is isolated after removal of the methyl benzoate. If necessary, residual dimethyl terephthalate and methyl benzoate may be removed by washing with hot ethanol.

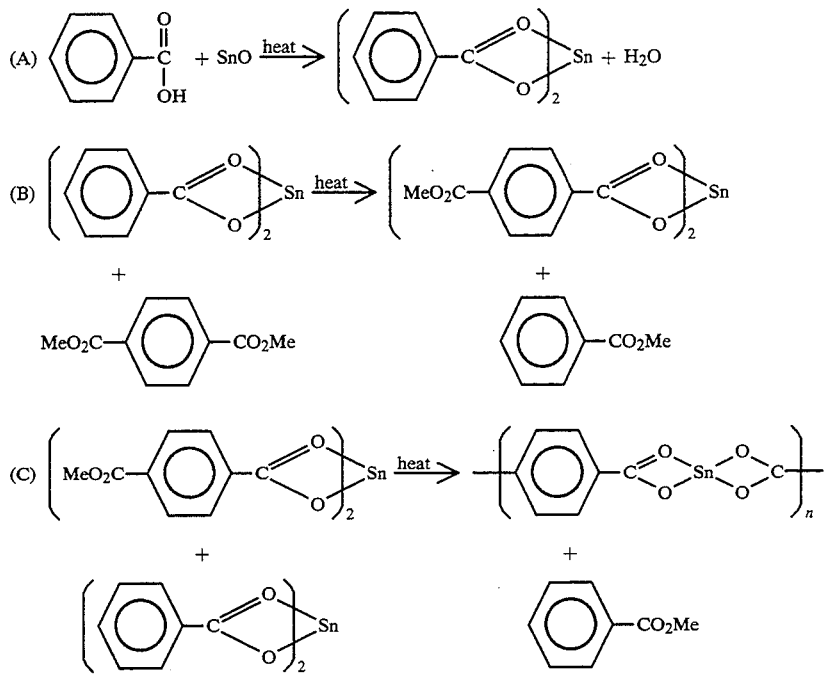

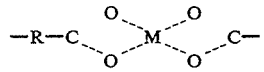

wherein R and $R^1$ are as defined above. Preferably, between steps (A) and (B) the water is removed, and between steps (B) and (C) the alkyl ester of an aromatic monocarboxylic acid is removed. The water byproduct from step (A) may be removed by such method as distillation. The alkyl ester of an aromatic monocarboxylic acid byproduct from step (B) may be removed by such method as distillation and/or washing with a hot alcohol such as hot ethanol. The step designated as (A) above is preferably conducted at a temperature sufficient to melt the aromatic monocarboxylic acid, and is preferably a temperature of greater than 160° C., with an increasing temperature during the reaction such that the final temperature of the reaction mixture is above 190° C. (above the melt temperature of the metal aromatic ester) to insure that the metal aromatic ester is a melt.

Similarly, it is preferred that the reactions of the above step (B) and the above step (C) need to be conducted at temperatures above the melt temperatures of the reactants and products of the respective steps.

Examples

It has been observed that at temperatures greater than 160° C., SnO reacts with 2 equivalents of benzoic acid to give tin(II) benzoate and water in a solventless reaction. The water is removed by distillation. At the end of It is expected that this synthetic strategy may be extended to Sn(II) polymers which contain other aromatic dicarboxylates such as, but not limited to, isophthalate and phthalate acids. In addition it should be possible to incorporate other segments such as, but not restricted to, butanediol, ethylene glycol, cyclohexanediol, 2,2,4,4,-tetramethylcyclobutanediol, 1,1,3,3,-tetramethyl-1,3-bis(4-carboxymethylphenyl)disiloxane (dimethyl-DACS). It should also be possible to incorporate other metals such as, but not limited to Be, Mg, Ca, Sr, Ba, Ra, Sn, Pb, Ge, Hg, Cd, Zn, Cu, Ni, Pd, Pt, Co, Rh, Ir, Fe, Ru, Os, Ti, Zr, Hf, Cr, Mo, W, and Mn in the polymer backbone.

We claim:

1. A melt process for making a poly(metal aromatic ester) resin, comprising:
   (a) reacting

 (i)

with

MO (ii)

to produce

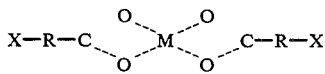

wherein M is a divalent metal selected from, Be, Mg, Ca, Sr, Ba, Ra, Sn, Pb, Ge, Hg, Cd, Zn, CU, Ni, Pd, Pt, Co, Rh, Ir, Fe, Ru, Os, Ti, Zr, Hf, Cr, Mo, W, or Mn and X is selected from the group consisting of hydrogen, halogens, amines, nitros and alkyl radicals, (b) reacting said

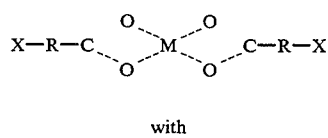 (i)

with

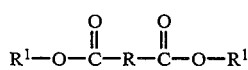 (ii)

to produce

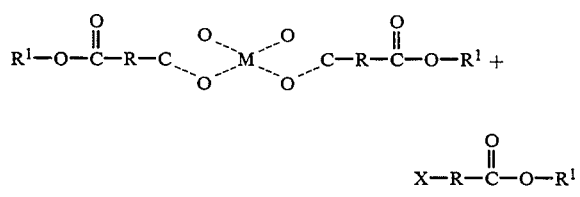

(c) reacting said

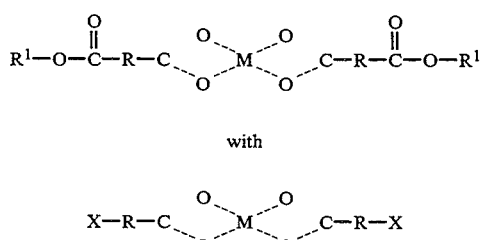

with

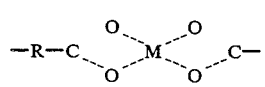

to produce said poly(metal aromatic esters), said poly(metal aromatic esters) comprising units of the formula $$-R-C\overset{O}{\underset{O}{\diagdown}}M\overset{O}{\underset{O}{\diagup}}C-$$

said R being a divalent aromatic radical, and said $R^1$ being a monovalent hydrocarbon radical wherein said reactions (a), (b) and (c) and conducted at a temperature sufficient to melt the reactants.

2. The process of claim 1 wherein $R^1$ is an alkyl radical having from 1 to 4 carbon atoms.

3. The process of claim 1 wherein R is of the formula:

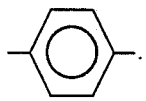

4. The process of claim 1 wherein M is tin(II).

5. The process of claim 1 wherein X is hydrogen, and $H_2O$ is produced in (a) and is separated from said

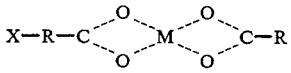

by distillation.

6. The process of claim 1 wherein said process consists essentially of said (a), (b) and (c).

7. The process of claim 5 wherein said process consists of said (a), (b) and (c).

8. The process of claim 1 wherein $R^1$ is a methyl group.

9. A process for making poly(tin(II) aromatic ester) comprising:

(a) reacting

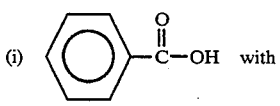 with (ii) SnO to produce

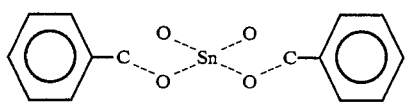

and $H_2O$ (b) separating said

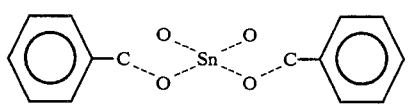

from said $H_2O$ (c) reacting said

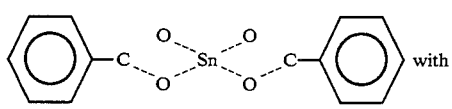 with

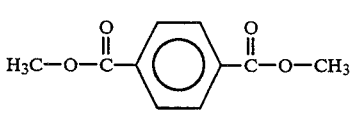

to produce

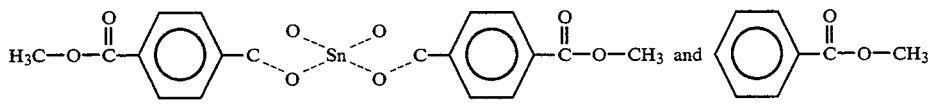

d) separating said

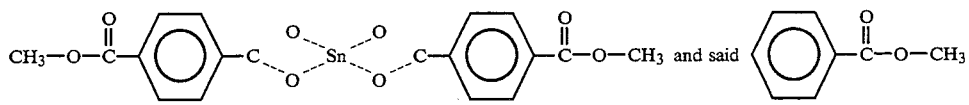

e) reacting said

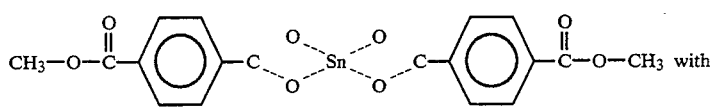

with

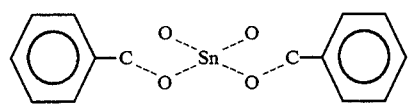

to produce poly(tin(II) aromatic ester) comprising units of the formula

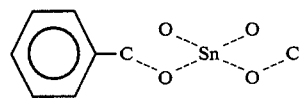

wherein said reactions (a), (c), and (e) are conducted at a temperature sufficient to melt the reactants.

10. The process of claim 1 wherein M is a metal select from the group II or group IV metals.

11. A poly(metal aromatic ester) resin made from the process of claim 1.

12. The poly(metal aromatic ester) resin of claim 1 wherein said poly(metal aromatic ester) resin contains less than 10 parts by weight of metal halide salt based on one million parts by weight of poly(metal aromatic ester) resin.

13. The process of claim 1, wherein M is a metal selected from Group IV metals.

* * * * *